United States Patent [19]
Hauck et al.

[11] 3,898,236

[45] Aug. 5, 1975

[54] 2,3,3A,4,6,7,8,9,9A,9B-DECAHYDRO-4-(PHENYL OR SUBSTITUTED PHENYL)-1H-PYRROLO(3,4-H) ISOQUINOLINES

[75] Inventors: Frederic Peter Hauck, Somerville, N.J.; Joseph E. Sundeen, Yardley, Pa.

[73] Assignee: E. R. Squibb & Sons, Inc., Princeton, N.J.

[22] Filed: Sept. 30, 1974

[21] Appl. No.: 510,205

Related U.S. Application Data

[63] Continuation-in-part of Ser. No. 295,386, Oct. 5, 1972, abandoned, Continuation-in-part of Ser. No. 295,386, Oct. 5, 1972, abandoned.

[52] U.S. Cl. 260/288 CF; 260/283 SY; 260/290 H; 260/293.72; 424/258
[51] Int. Cl.$^2$............... C07D 215/46; C07D 217/12
[58] Field of Search............... 295/386; 260/288 CF

[56] References Cited
OTHER PUBLICATIONS
Gautier, Ph.D Thesis, 1966, University of New Hampshire

*Primary Examiner*—Donald G. Daus
*Assistant Examiner*—David E. Wheeler
*Attorney, Agent, or Firm*—Lawrence S. Levinson; Merle J. Smith; Stephen B. Davis

[57] ABSTRACT

2,3,3a,4,6,7,8,9,9a,9b-Decahydro-4-(phenyl or substituted phenyl)-1H-pyrrolo[3,4-h]isoquinolines and their methods of preparation are disclosed. In addition, pharmaceutical compositions containing said compounds and methods for using said compositions as anti-inflammatory, antianginal and anti-arrhythmic agents are disclosed.

3 Claims, No Drawings

2,3,3A,4,6,7,8,9,9A,9B-DECAHYDRO-4-(PHENYL OR SUBSTITUTED PHENYL)-1H-PYRROLO(3,4-H) ISOQUINOLINES

This application is a continuation-in-part of Ser. No. 295,386 filed on Oct. 5, 1972 now abandoned.

This invention is directed to compounds of the formula

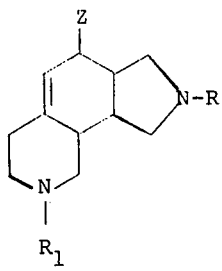

IV wherein Z is phenyl or substituted phenyl; $R_1$ is hydrogen, lower alkyl, or phenyl-lower alkyl; and R is hydrogen, lower alkyl, phenyl, or phenyl-lower alkyl; and pharmaceutically acceptable acid addition salts thereof.

The term substituted phenyl is intended to encompass one or two substituents which may be alike or different and which are selected from the group consisting of lower alkyl, lower alkoxy, nitro, halogen, trifluoromethyl, cyano, carbolower alkoxy, and carboxy.

The term lower alkyl is intended to mean a straight or branched chain alkyl group of from one to eight carbon atoms.

The term lower alkoxy is intended to means a straight or branched chain alkyl group of from one to eight carbon atoms linked directly to an oxygen atom.

The compounds of the present invention may exist in a number of optical or geometric isomeric forms such as steroisomeric forms, endo and exo forms, etc. All of these optical and geometric isomers are intended to be within the scope of the present invention. Position isomers of the compounds of formula IV are disclosed in copending application Ser. No. 295,385 filed on Oct. 5, 1972.

The preferred compounds of this invention are those wherein R and $R_1$ are methyl, and Z is phenyl or methoxyphenyl.

The compounds of this invention may be prepared by reacting 4-picoline with a substituted benzaldehyde

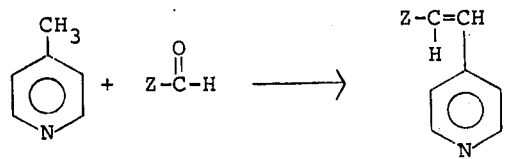

I to yield the intermediate of formula I. The compound of formula I is then reacted with an halide and reduced to yield the intermediate

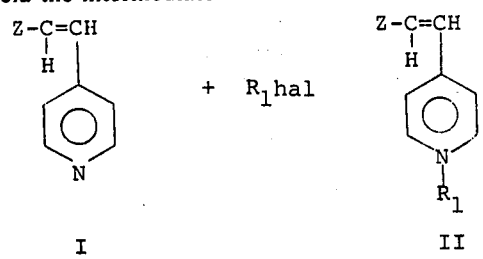

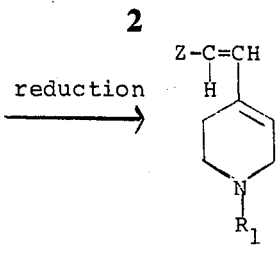

III of formula III. The intermediate of formula III is reacted with a dienophile of the formula

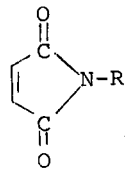

followed by reduction with lithium aluminum hydride to yield the products of formula IV.

The production of the intermediate of formula III by this sequence is disclosed in the Ph.D Thesis of George Gautier (University of New Hampshire, 1966).

Gautier reports the ability of an intermediate of formula III to react with the dienophile N-phenylmaleimide to give the Diels-Alder Adduct. However, this same thesis reports the inability of maleic anhydride to react with a compound of formula III. Since maleic anhydride and N-phenylmaleimide are two of the most reactive dienophiles, the ability of compounds of formula III to part take in the Diels-Alder Reaction on a broad basis and not in just one isolated case seemed very much in question.

This invention teaches the procedures enabling one to react compounds of formula III with most dienophiles and obtain the desired Diels-Alder Adduct.

Most dienophiles are either of an acidic nature, such as maleic anhydride, acrylic acid, fumaric acid, etc. or neutral, such as N-phenylmaleimide, ethyl acrylate, acrylonitrile, dimethyl fumarate, etc. It has been found that dienophiles of an acidic nature in many cases will react with compounds of formula III only wherein the compounds of formula III are reacted in the form of a salt of a strong acid. While this requirement is not necessary for the neutral dienophiles, it has been generally found that where strong acid salts, such as hydrochlorides, sulfates, etc. are used, cleaner reactions result.

Thus the reaction of maleic anhydride with the hydrochloride of III gives the desired Diels-Alder Adduct IVa

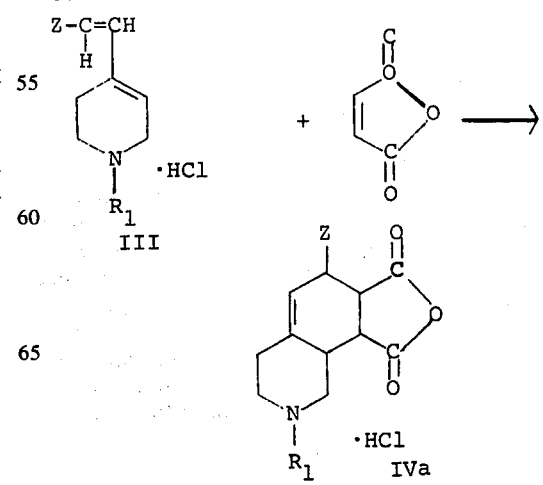

which in turn can be reacted with an amine of the formula R-NH₂ and reduced with lithium aluminum hydride

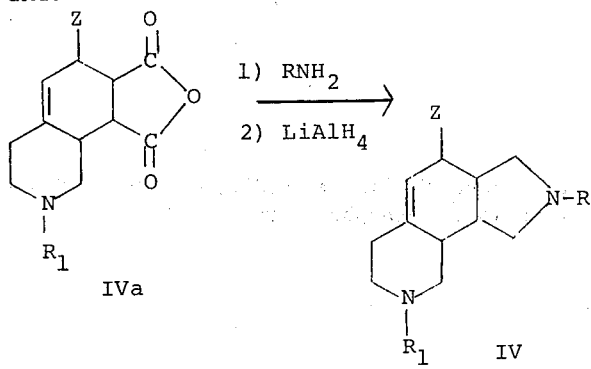

to yield the final products of formula IV.

The reaction of the salt of formula III and the dienophile are generally carried out in a lower alkanoic acid-lower alkanoic acid anhydride mixture, such as acetic acid - acetic anhydride, butyric acid - butyric anhydride, acetic acid - propionic anhydride, etc. at a temperature range of from about 75° to about 175°C, preferably 120° to 140°C. Reaction rates vary considerably; however, the reactions can be followed by way of thin film chromatography and are continued until completion which is usually within a 24 hour period.

Typical dienophiles which may be employed in the process of this invention are given in Organic Reactions, Vol. IV, p. 2–3, more specifically maleic anhydride, maleic acid, fumaric acid, diethyl maleate, diethyl fumarate, maleimide, N-substituted maleimides, acrylonitrile, ethyl acrylate, acrylic acid, etc.

The dienes are used in the form of a salt of a strong acid and the amino group must also be trisubstituted. Some typical examples of dienes which may be employed in the process of this invention are 1-methyl-4-styryl-1,2,5,6-tetrahydropyridine and 1-benzyl-4-p-methoxystyryl-1,2,5,6-tetrahydropyridine.

In carrying out the initial process of this invention, a tertiary amine is employed. In order to obtain the useful secondary amines or compounds which are readily prepared from secondary amines, a tertiary benzyl amine is employed in the Diels-Alder Reaction and removed by utilizing a catalytic amount of palladium on charcoal in an organic solvent such as ethanol in the presence of hydrogen. This reaction is of special interest, since one would expect the double bond to be reduced simultaneously; however, such is not the case and high yields of debenzylated olefin is obtained.

The resultant secondary amines are converted to other useful tertiary amines by alkylation using alkylating agents such as dimethyl sulfate, methyl iodide, etc. or amides by acylation using acylating agents such as acetyl chloride, propionic anhydride, etc.

The compounds of formula IV and their pharmaceutically acceptable acid addition salts have been found to be highly useful as antiinflammatory agents, antianginal agents and antiarrhythmic agents in mammals, such as cattle, dogs, sheep, etc. when administered in amounts ranging from about 0.3 mg to about 15 mg per kg of body weight per day. A preferred dosage regimen for optimum results would be from about 0.6 mg to about 10 mg per kg of body weight per day, and such dosage units are employed that a total of from about 20 mg to about 280 mg of active ingredient for a subject of about 70 kg body weight are administered in a 24 hour period preferably, 40 mg to 140 mg. The compounds of the present invention in the described dosages are intended to be administered orally; however, other routes such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 5 and 250 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills, or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

1,2,3,6-Tetrahydro-4-(p-methoxystyryl)-1-methylpyridine, hydrochloride a. A mixture of 4-picoline (280 g, 3.0 moles), p-methoxybenzaldehyde (410 g, 3.0 moles), and 500 ml of acetic anhydride is refluxed for 24 hours, cooled, evaporated in vacuo, and the residue taken up in water and basified with 10% NaOH. The solid is filtered and crystallized from ethanol and water to give 350 g (55%) of the crude base. Recrystallization gives pure 4-(p-methoxystyryl)-pyridine, mp 128°–130°.

b. The crude 4-(p-methoxystyryl)-pyridine (160 g, 0.76 mole) in 300 ml acetonitrile is heated to effect solution, then treated with 100 ml (2.3 moles) methyl iodide, in portions. The mixture is refluxed on steam bath for 1 hour, then cooled to afford 210 g (87%) of crystalline methiodide.

c. A solution of 100 g (0.31 mole) of the methiodide in 800 ml of aqueous methanol is treated at 40°C (cooling) with 22 g of sodium borohydride, in portions, then stirred at 35°C for 2 hours. The mixture is cooled and extracted with ether. The dried ($K_2CO_3$) extract is evaporated to give 60 g of crude diene amine (83%).

d. The free base (60 g) is taken up in 1 liter of isopropanol and treated with HCl in isopropanol in excess. After 16 hours at 0°C, ether is added to complete crystallization of the hydrochloride (53 g, 76%).

e. A 10 g sample of the crude hydrochloride is recrystallized from isopropanol, then from isopropanol-methanol to give 6.4 g of the analytical sample, mp 219°–221°C.

EXAMPLE 2

According to the method of Example 1, if one substitutes in place of the p-methoxybenzaldehyde, an equivalent amount of o-chlorobenzaldehyde one obtains the hydrochloride of 1,2,3,6-tetrahydro-4-(o-chlorostyryl)-1-methylpyridine.

EXAMPLES 3–5

According to the method of Example 1, if one substitutes in place of the methyl iodide, the following compounds:
 ethyl iodide,
 phenethyl iodide, and
 i-propyl iodide,
one obtains:
 1,2,3,6-tetrahydro-4-(p-methoxystyryl)-1-ethylpyridine hydrochloride,
 1,2,3,6-tetrahydro-4-(p-methoxystyryl)-1-phenethylpyridine hydrochloride, and
 1,2,3,6-tetrahydro-4-(p-methoxystyryl)-1-i-propylpyridine hydrochloride, respectively.

EXAMPLE 6

1-Benzyl-1,2,3,6-tetrahydro-4-(p-methoxystyryl)-pyridine, hydrochloride a. A mixture of 4-picoline (280 g, 3.0 moles), p-methoxy benzaldehyde (410 g, 3.0 moles) and 500 ml acetic anhydride is refluxed for 24 hours, cooled, evaporated in vacuo, and the residue taken up in water and basified with 10% sodium hydroxide. The solid is filtered and crystallized from ethanol and water to give 350 g (55%) crude 4-(p-methoxystyryl)-pyridine.

b. The crude styrene (84 g, 0.4 moles) in 1 liter of acetonitrile is heated to effect solution, then treated with 80 ml (0.7 moles) benzyl chloride dropwise over 20 minutes. The mixture is refluxed for 3.5 hours under nitrogen and allowed to cool. The crystals are filtered (109 g) and a second crop obtained by adding ether to the filtrate (9 g, 88%).

c. The crystalline benzyl chloride salt (118 g, 0.35 moles) is dissolved in 1 liter methanol and sodium borohydride (20 g, 0.53 moles) is added in portions with stirring (T 35°C). This is stirred for 1 hour and the solid filtered. The solid is dissolved in dichloromethane, dried (potassium carbonate), and evaporated to yield 97 g (90%) of 1-benzyl-1,2,3,6-tetrahydro-4-(p-methoxystyryl)-pyridine.

d. The tetrahydrostyrene (64 g) is dissolved in 4 liters of ether and filtered. Then hydrochloric acid in isopropanol is added until the solution is acid to pH paper. The solid is recrystallized from ethanol to yield 50.5 g (72%) of the hydrochloride salt, mp 239–254 with decomposition.

EXAMPLE 7

1,2,3,6-Tetrahydro-1-methyl-4-styrylpyridine hydrochloride

To a cooled and stirred solution of 1,2,3,6-tetrahydro-1-methyl-4-styrylpyridine (53.6 g) prepared according to the method of Gautier (Ph. D. Thesis, University of New Hampshire, 1966 p. 134) in dry ether (300 ml), isopropanol saturated with dry hydrochloric acid is added until precipitation was complete. The product after ether washing and recrystallization from methanol-ether is obtained in a 68 percent yield, which melts with decomposition at 289.5°–290°C.

EXAMPLES 8–9

According to the method of Example 7, if one substitutes in place of the 1,2,3,6-tetrahydro-1-methyl-4-styrylpyridine the following compounds prepared utilizing the general procedure of Gautier:
 1,2,3,6-tetrahydro-1-benzyl-4-(o-methylstyryl)-pyridine,
 and 1,2,3,6-tetrahydro-1-propyl-4-(p-trifluoromethylstyryl)pyridine;
one obtains the corresponding hydrochloride.

EXAMPLE 10

2,3,3a,4,6,7,8,9,9a,9b-Decahydro-4-(p-methoxyphenyl)-2,8-dimethyl-1H-pyrrolo[3,4-h]isoquinoline, dihydrochloride a. 3a,4,6,7,8,9,9a,9b-Octahydro-4-(p-methoxyphenyl)-2,8-dimethyl-2H-pyrrolo[3,4-h]isoquinoline-1,3-dione A solution of 15 g. (0.065 moles) of 1,2,3,6-tetrahydro-4-(p-methoxystyryl)-1-methylpyridine (free base of the product from example 1), 15 g. of N-methylmaleimide, 150 ml. of toluene and 20 mgs. of hydroquinone are refluxed overnight under nitrogen. The solution is allowed to cool and evaporate. Benzene is added and evaporated twice. Water is added and the oil is extracted with benzene. The organic layers are evaporated and the residue is crystallized, filtered, and washed with ether to yield 7.85 g. of 3a,4,6,7,8,9,9a,9b-octahydro-4-(p-methoxyphenyl)-2,8-dimethyl2H-pyrrolo[3,4-h]isoquinoline-1,3-dione. Recrystallization of 1.8 g. from dichloromethane-hexane afforded 1.3 g. of an analytical sample; m.p. 129°–130°C.

b. 2,3,3a,4,6,7,8,9,9a,9b-Decahydro-4-(p-methoxyphenyl)-2,8-dimethyl-1H-pyrrolo[3,4-h]isoquinoline, dihydrochloride A solution of 6.7 g. (0.02 moles) of 3a,4,6,7,8,9,9a,9b-octahydro-4-(p-methoxyphenyl)-2,8-dimethyl-2H-pyrrolo[3,4-h]isoquinoline-1,3-dione from part (a) in 100 ml. of dichloromethane-ether (1:1) is added to a slurry of 3 g. (0.08 moles) of lithium aluminum hydride in 300 ml. dichoromethane-ether (1:1) under nitrogen. This is refluxed for 18 hours. Saturated sodium carbonate solution is added at room temperature until the reaction is white. The salts are filtered and washed with dichloromethane. The combined filtrates are evaporated to yield 5.5 g. (90%) 2,3,3a,4,6,7,8,9,9a,9b-decahydro-4-(p-methoxyphenyl)-2,8-dimethyl-1H-pyrrolo[3,4-h]isoquinoline. This is dissolved in isopropanol-ether, and hydrochloric acid in isopropanol is added until the solution is acidic to pH paper. Excess ether is added and the white solid filtered. Recrystallization of this solid from isopropanol-methanol-ether affords an analytical sample of about 3.1 g., m.p. 273°C.

EXAMPLE 11

2,3,3a,4,6,7,8,9,9a,9b-Decahydro-4-phenyl-2,8-dimethyl-1H-pyrrolo[3,4-h]isoquinoline, dihydrochloride a. 1,2,3,4,6,7,8,8a-Octahydro-2-methyl-6-phenyl-7,8-isoquinoline dicarboxylic acid anydride, hydrochloride A solution of 50 g. maleic anhydride and 10 g. 1,2,3,-6-tetrahydro-1-methyl-4-styrylpyridine hydrochloride, from example 7, in 100 ml. acetic acid and 100 ml. acetic anhydride previously thoroughly sparged with dry nitrogen is refluxed gently for 3 hours under nitrogen. The reaction mixture is concentrated to 100 ml. volume, and flushed with 300 ml. benzene to remove most of the remaining solvent. The residue is triturated with benzene several times to give 17.5 g. of a crude brown product. This compound is not further purified. It is refrigerated in the dry state for storage.

b. 2,3,3a,4,6,7,8,9,9a,9b-Decahydro-4-phenyl-2,8-dimethyl-1H-pyrrolo[3,4-h]isoquinoline, dihydrochloride The anhydride from part (a) is added portionwise to a stirred solution of aqueous methylamine. The solution is heated to boil off the water. The heating is continued with stirring until the evolution of gas ceases and the reaction mixture is maintained at from 200° to 225°C for about one-half to 1 hour. The resulting product is reduced with lithium aluminum hydride according to the procedure of example 10(b) to yield and titled product.

Alternatively, the titled product can be prepared by following the procedure of example 10 but employing 1,2,3,6-tetrahydro-1-methyl-4-styrylpyridine in part (a) of example 10.

EXAMPLE 12

2,3,3a,4,6,7,8,9,9a,9b-Decahydro-4-phenyl-8-benzyl-2-methyl1H-pyrrolo[3,4-h]isoquinoline, dihydrochloride Following the procedure of example 10 but employing 1,2,3,6-tetrahydro-1-benzyl-4-styrylpyridine in part (a) of example 10, one obtains the titled product.

Similarly, by employing the compounds of any of examples 2 to 6, 8, or 9 in the procedure of example 10 other compounds within the scope of the invention are obtained.

Example 13

Preparation of capsule formulation

| Ingredient | Milligrams per Capsule |
| --- | --- |
| 2,3,3a,4,6,7,8,9,9a,9b-decahydro-4-(p-methoxyphenyl)-2,8-dimethyl-1H-pyrrolo[3,4-h]isoquinoline, dihydrochloride | 200 |
| Starch | 95 |
| Magnesium stearate | 5 |

The active ingredient, starch and magnesium stearate are blended together. The mixture is used to fill hard shell capsules of a suitable size at a fill weight of 300 milligrams per capsule.

What is claimed is:

1. A compound of the formula:

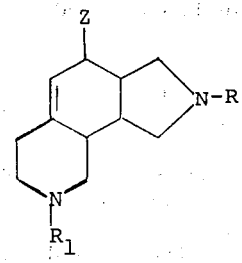

wherein Z is selected from the group consisting of phenyl and methoxyphenyl; and $R_1$ and R are methyl; and the pharmaceutically acceptable acid addition salts thereof.

2. The compound of claim 1 wherein Z is p-methoxyphenyl.

3. The compound of claim 1 wherein Z is phenyl.

* * * * *

UNITED STATES PATENT AND TRADEMARK OFFICE
CERTIFICATE OF CORRECTION

PATENT NO. : 3,898,236
DATED : Aug. 5, 1975
INVENTOR(S) : F. P. Hauck et al.

It is certified that error appears in the above-identified patent and that said Letters Patent are hereby corrected as shown below:

Col. 1, line 33, "means" should read --mean--.

Col. 5, line 61 "(T   35°C)" should read --(T $\leq$ 35°C)--.

Col. 6, line 48, "dimethyl2H" should read --dimethyl-2H--.

Col. 6, line 60, "dichoromethane" should read --dichloromethane--.

Col. 7, line 45, "methyl1H" should read --methyl-1H--.

Signed and Sealed this seventh Day of October 1975

[SEAL]

Attest:

RUTH C. MASON
Attesting Officer

C. MARSHALL DANN
Commissioner of Patents and Trademarks